(12) United States Patent
Schaffner et al.

(10) Patent No.: US 10,928,519 B2
(45) Date of Patent: Feb. 23, 2021

(54) CW LIDAR WIND VELOCITY SENSOR FOR OPERATION ON A STRATOSPHERIC VEHICLE

(71) Applicant: HRL Laboratories, LLC, Malibu, CA (US)

(72) Inventors: James H. Schaffner, Chatsworth, CA (US); Richard M. Kremer, Malibu, CA (US); Raymond Sarkissian, Malibu, CA (US); Andrew C. Keefe, Encino, CA (US); Pamela R. Patterson, Los Angeles, CA (US); Erik S. Daniel, Malibu, CA (US); Brian N. Limketkai, Malibu, CA (US); Guillermo A. Herrera, Winnetka, CA (US); Keyvan R. Sayyah, Santa Monica, CA (US); Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 326 days.

(21) Appl. No.: 15/947,742

(22) Filed: Apr. 6, 2018

(65) Prior Publication Data
US 2018/0356528 A1    Dec. 13, 2018

Related U.S. Application Data

(60) Provisional application No. 62/517,804, filed on Jun. 9, 2017.

(51) Int. Cl.
*G01P 3/36* (2006.01)
*G01S 17/95* (2006.01)
(Continued)

(52) U.S. Cl.
CPC ............... *G01S 17/95* (2013.01); *G01P 5/26* (2013.01); *G01P 13/02* (2013.01); *G01S 7/483* (2013.01); *G01S 7/4917* (2013.01); *G01S 17/58* (2013.01)

(58) Field of Classification Search
CPC .......... G01S 17/58; G01S 17/95; G01S 7/483; G01S 7/4917; G01P 5/26; G01P 13/02
(Continued)

(56) References Cited

U.S. PATENT DOCUMENTS 5,485,009 A * 1/1996 Meyzonnetie .......... G01S 17/87
                                                      250/208.1
5,610,705 A * 3/1997 Brosnan .................... G01P 3/36
                                                        356/28.5
(Continued)

FOREIGN PATENT DOCUMENTS

| CN | 102681033 | 9/2012 |
| CN | 103472255 | 12/2013 |
| WO | 2016/144528 A1 | 9/2016 |

OTHER PUBLICATIONS

PCT International Search Report and Written Opinion from PCT/US2018/026608 dated Mar. 29, 2019.
(Continued)

*Primary Examiner* — Mark Hellner
(74) *Attorney, Agent, or Firm* — Ladas & Parry

(57) ABSTRACT

A continuous wave (CW) heterodyne light detection and ranging (LIDAR) air velocity sensor system that comprises a first light emitting structure arranged to send a signal light in a first direction in space; a second light emitting structure arranged to produce a local oscillator light having a wavelength different from the wavelength of the signal light by a predetermined wavelength; a receiver arranged to receive light from said first direction in space; and a first optical
(Continued)

mixer for mixing the received light with said local oscillator light.

16 Claims, 8 Drawing Sheets

(51) Int. Cl.
  *G01S 7/483* (2006.01)
  *G01S 17/58* (2006.01)
  *G01P 13/02* (2006.01)
  *G01P 5/26* (2006.01)
  *G01S 7/4912* (2020.01)
(58) Field of Classification Search
  USPC .......................................................... 356/28
  See application file for complete search history.

(56) References Cited

U.S. PATENT DOCUMENTS

| | | | |
|---|---|---|---|
| 5,745,437 | A | 4/1998 | Wachter |
| 10,641,649 | B1* | 5/2020 | Butman ............. H04B 10/6163 |
| 2007/0215795 | A1 | 9/2007 | Kameyama |
| 2010/0277714 | A1 | 11/2010 | Pedersen |
| 2011/0285980 | A1 | 11/2011 | Newbury |
| 2012/0169053 | A1* | 7/2012 | Tchoryk, Jr. ............. G01W 1/02 290/44 |
| 2014/0036252 | A1* | 2/2014 | Amzajerdian .......... G01S 17/58 356/28 |
| 2014/0233013 | A1 | 8/2014 | Sakimura |
| 2015/0015869 | A1* | 1/2015 | Smith ..................... G01S 17/58 356/28.5 |
| 2015/0055115 | A1 | 2/2015 | Pedersen |
| 2015/0378012 | A1 | 12/2015 | Sayyah |
| 2018/0172806 | A1* | 6/2018 | Marron .................... G01S 13/89 |

OTHER PUBLICATIONS

"Development and Operational Analysis of an All-Fiber Coherent Doppler Lidar System for Wind Sensing and Aerosol Profiling" by S. Abdelazim, D. Santoro, M. F. Arend, F. Moshary and S. Ahmed (IEEE Transactions on Geoscience and Remote Sensing, vol. 53, No. 12, pp. 6495-6506, Dec. 2015).

"High Resolution Doppler Lidar for Boundary Layer and Cloud Research", by C.J. Grund, Et al. (Journal of Atmospheric and Oceanic Technology. 2001, V18 p. 376.).

"Long-range, noncoherent lasers Doppler velocimeter", by S. H. Bloom, R. Kremer, P. A. Searcy, M. Rivers, J. Menders, and Eric Korevaar (Optics Letters vol. 16, Issue 22, pp. 1794-1796 (1991)).

"Packaged Semiconductor Laser Optical Phase-locked Loop (OPLL) for Photonic Generation, Processing and Transmission of Microwave Signals", by L. N. Langley et al. (IEEE Transactions on Microwave Theory and Techniques, vol. 47, No. 7, pp. 1257-1264, Jul. 7, 1999).

"Spot-size Converter with a SiO2 Spacer Layer Between Tapered Si and SiON Waveguides for Fiber-to-chip Coupling", Y. Maegami, R. Takei, E. Omoda, T. Amano, M. Okano, M. Mori, T. Kamei, and Y. Sakakibara, Opt. Express 23, p. 21287-21295, Aug. 5, 2015.

"High-speed Balanced Photodetector Module with 20 dB Broadband Common-mode Rejection Ratio", A. Beling et al. (OFC 2003 Optical Fiber Communications Conference, 2003., 2003, pp. 339-340 vol. 1).

"Development of a CMOS Compatible Biophotonics Platform Based on SiN Nanophotonic Waveguides", by Pieter Neutens, et.al., (DOI:10.1364/CLEO_AT.2014.JTh2A.31 Conference: CLEO: Applications and Technology).

"Low Loss CMOS-Compatible PECVD Silicon Nitride Waveguides and Grating Couplers for Blue Light Optogenetic Applications", by L. Hoffman et al., in IEEE Photonics Journal, vol. 8, No. 5, pp. 1-11, Oct. 2016.

"Laser Rayleigh Scattering" by Richard B Miles, Walter R Lempert, and Joseph N Forkey, [Meas. Sci. Technol. 12 (2001) R33-R51].

Robert D. Gunther, Modern Optics, John Wiley and Sons, New York, 1990m p. 183.

"Efficient coupling of polarization-maintaining fiber to laser diodes", by H. M. Presby and C. A. Edwards (in IEEE Photonics Technology Letters, vol. 4, No. 8, pp. 897-899, Aug. 1992).

"Ultralow-Threshold Laser Realized in Zinc Oxide" by H. Zhu, et. al. (Advanced Material, 2009, 21, 1613-1617).

"Tunable high-power narrow-linewidth semiconductor laser based on an external-cavity tapered amplifier" by M. Chi, O. Jensen, J. Holm, C. Pedersen, P. Andersen, G. Erbert, B. Sumpf, and P. Petersen (Opt. Express 13, 10589-10596 (2005)).

Available at www.excelitas.com/Downloads/Silicon_InGaAs_APDs.pdf.

Available at www.alphalas.com/images/stories/products/laser_diagnostic_tools/Ultrafast_Photodetectors_UPD_ALPHALAS.pdf.

Available at http://www.analog.com/en/products/analog-to-digital-converters/ad-converters/ad7173-8.html.

PCT International Preliminary Report on Patentability (Chapter II) from PCT/US2018/026608 dated Oct. 8, 2019.

Office Action from Chinese Patent Application No. 201880037367.7 dated Aug. 18, 2020 and search report with its English translation.

Extended European Search Report from EPO Patent Application No. 18823064.3 dated Nov. 16, 2020.

Office Action from Chinese Patent Application No. 201880037367.7 dated Dec. 17, 2020 and brief English summary.

* cited by examiner

| Function | CW Doppler LIDAR | Pulsed Coherent LIDAR | Pulsed, non-coherent LIDAR |
|---|---|---|---|
| LASER | Semiconductor blue LASER, High wall-plug efficiency, small, light weight | Solid-state, diode-pumped LASER (usually). Multiple stages reduce wall-plug efficiency. Pulse duration long enough to prevent sidebands from skewing the scattered distribution and spoiling the Doppler measurement. | Solid-state, diode-pumped LASER (usually). (short pulse ok). Must be 'locked' to the center of the passive spectral sensor. |
| Spectral (frequency) sensor | The heterodyne offset spectral sensor is the highest sensitivity. It measures the steepest portions of the limiting distribution. | Also heterodyne frequency determination. The LASER temporal pulse shape influences spectral sensitivity | Optical line filter' (e.g. etalon, Faraday atomic line filter, absorption cell.) Sensitivity is limited by the multi-GHz width of the Doppler broadened backscatter |
| Beam pointing | Laser power distributed by fibers to the launch positions through several fixed optics. NO MOVING PARTS! | Beam director required. Large power and weight. Motors and controllers. The necessary long pulse laser beam format is hard to use with fiber | Beam director required. Large, heavy motors and controllers |
| Range determination | Modified optical range-finder technique to achieve 7 range bins of length 333m. Also called internal parallax | Pulse time of flight. Capable of range resolution much tighter than the allowed 333m. | Pulse time of flight. Capable of range resolution much tighter than the allowed 333m. |
| Robust Design | No moving parts - can't seize or get stuck, On-chip interferometry - always in alignment since laser mode is controlled by waveguide, semiconductor lasers - low voltage DC operation, low speed digital electronics - easy and available. | Beam director needed - motors, bearings, ring-seals and gears can seize or bind, Free space interferometry - setting and holding alignment is a challenge, pulsed laser - heavy with a noisy pulse forming network | Beam director needed - motors, bearings, ring-seals and gears can seize or bind, optical filter element is sensitive to temperature and vibration, pulsed laser - heavy with a noisy pulse forming network |

FIGURE 14

CW LIDAR WIND VELOCITY SENSOR FOR OPERATION ON A STRATOSPHERIC VEHICLE

RELATED APPLICATIONS

The present application claims priority to U.S. provisional application No. 62/517,804, filed on Jun. 9, 2017, which is hereby incorporated by reference.

TECHNICAL FIELD

This presentation relates to LIght Detection And Ranging (LIDAR) systems; and in particular to a Continuous Wave (CW) LIDAR arranged to probe wind velocity.

BACKGROUND

Two approaches have been used previously for stratospheric wind velocity determination: coherent pulsed Doppler LIDAR, and non-coherent pulsed Doppler LIDAR. However, a fundamental drawback to coherent pulsed Doppler LIDAR resides in the required pulsed laser, particularly for stratospheric wind sensing, because the required laser pulse length has opposing criteria. On one hand, a short pulse (such as <1 ns) is the best for high power, efficiency and repeatability. On another hand, a long pulse (such as >100 ns) is required in order to have sufficient frequency resolution for wind velocity measurement. Any choice of laser pulse will necessarily be a compromise of either Doppler performance, energy efficiency, or both. Whatever pulse length is chosen, the pulse will be temporally asymmetric and that asymmetry will vary from pulse to pulse. This asymmetry leads to frequency side bands which are usually ignored for most applications since they are down by 20 to 30 dB and displaced by a significant fraction of a GHz. In the stratosphere, the atmospheric pressure is $\frac{1}{100}^{th}$ of that in the troposphere so that the amount of photons that get scattered back to the LIDAR receiver is small. If, for example, the measurement resolution of the wind speed was to be 2 m/s, then this is a 10 MHz shift in the distribution out of a total full width half maximum Power Spectral Density (PSD) of 5 GHz. The side bands are directly in the measurement region and are big enough to skew the result. Additional processing may be able to account for this, but at additional cost in terms of time and power.

For a non-coherent pulsed Doppler LIDAR, the sensitivity is governed by the slope of the transmission profile of the analysis cell used for frequency discrimination. Whether the cells are atomic line filters, etalons or molecular absorption filters, the slope of the filter would be limited by the width of the backscattered Doppler distribution. The linear portion of the slope must be as wide as or wider than the full width of the distribution. That means that the slope cannot be steeper than about $\frac{1}{10}$ GHz and for non-ideal filters, the slope is usually about a tenth that steep, or about 10 ps. It follows that it is difficult to make a high sensitivity non-coherent pulsed Doppler LIDAR.

The reference "Development and Operational Analysis of an All-Fiber Coherent Doppler Lidar System for Wind Sensing and Aerosol Profiling" by S. Abdelazim, D. Santoro, M. F. Arend, F. Moshary and S. Ahmed (IEEE Transactions on Geoscience and Remote Sensing, vol. 53, no. 12, pp. 6495-6506, December 2015), hereby incorporated by reference, discloses a 1.5 µm optical wavelength CW coherent LIDAR for wind sensing in the troposphere. Measurement of wind velocities in the troposphere can be made at these relatively long wavelengths because of the aerosols that are present in the troposphere. The main scattering mechanism is Mie scattering which is much stronger than Rayleigh scattering. Using this wavelength for stratospheric wind sensing would require a substantially larger laser to overcome the $1/\lambda^4$ backscatter relationship.

The reference "High Resolution Doppler Lidar for Boundary Layer and Cloud Research", by C. J. Grund, Et al. (Journal of Atmospheric and Oceanic Technology. 2001, V18 p. 376.), hereby incorporated by reference, discloses a pulsed coherent Doppler LIDAR for wind sensing. One issue with this approach is the very long laser pulse format (~100 ns) required by the signal bandwidth and the high-speed, power-hungry A/D converters implied by that format. Also, this method requires a beam-steering system (heavy) to point in the many directions required.

The reference "Long-range, noncoherent lasers Doppler velocimeter", by S. H. Bloom, R. Kremer, P. A. Searcy, M. Rivers, J. Menders, and Eric Korevaar (Optics Letters Vol. 16, Issue 22, pp. 1794-1796 (1991)), hereby incorporated by reference, discloses a noncoherent pulsed laser Doppler system. However, this system is heavy and power hungry, and its scattered return has a wide bandwidth, which limits the sensitivity of the approach. This system is well suited to wind sensing that depends on the presence of aerosols since the unbroadened backscatter (Mie scattering) from aerosols allows for the use of sharp-edged filters which improves sensitivity.

There exists a need for a Doppler LIDAR having high sensitivity and that requires a reduced amount of energy. There exists a need for a Doppler LIDAR that requires no moving parts.

SUMMARY

Embodiments of this presentation provides for a continuous wave (CW) heterodyne LIDAR system that uses optical mixing of a backscattered return signal with an optical local oscillator (LO) signal to produce an intermediate frequency (IF) such that the power spectral density (PSD) of the returned signal translated down to the IF would be centrally located, on average, at a microwave frequency (3-10 GHz). A CW LIDAR, as opposed to a pulsed LIDAR, can operate with a small and efficient semiconductor diode laser.

Embodiments of this presentation provides for a continuous wave (CW) heterodyne LIDAR system that comprises separate transmit and receive apertures to prevent stray transmitted light from inadvertently being detected.

Embodiments of this presentation provides for a continuous wave (CW) heterodyne LIDAR system that is arranged to probe the space surrounding it in a discrete number of directions. An embodiment of this presentation provides a LIDAR to measure wind velocities over a narrow solid angle field of view (FOV) that is on the order of $0.3*\pi$ or less, wherein the above probing can be accomplished by placing the ends of high power optical fibers at optical transmit locations around, but offset from, the optical axis of a single transmit lens. Such embodiment can comprise a corresponding optical receiver with a single input lens. For measurements over wider FOVs, multiple pairs of transmit and receive lens can be used, again with high power optical fibers ends located in an identical locations from the centers of each lens.

Embodiments of this presentation provides for a LIDAR mapping device comprising a plurality of CW heterodyne LIDAR systems having each a single transmit lens and a single input lens. Such a device comprises no moving parts, i.e. no gimbals or motors, and thus has high reliability and low weight.

Embodiments of this presentation provides for a CW heterodyne LIDAR system that comprises a centrally located transmit optical source and a switched fiber optic network that is used to distribute a high power optical signal to each of a plurality of transmitter points in a transmit telescope. The optical signal source is distributed to each transmit point sequentially so that the maximum optical power is transmitted in each direction for a specified length of time. This central location also has another source that is used to produce the LO signal. This LO source is maintained at a specified frequency offset from the signal source using a photonic phased locked loop. The LO signal is distributed to each receiver of a plurality of receivers using a fiber optic switch network so that corresponding transmit and receive directions of the transmit and receive telescope are activated at the same time.

According to embodiments of this presentation, each receiver comprises a linear array of optical collection points oriented in such a manner that the light that is backscattered from different ranges from the sensor are focused at different collection points along the linear array. This allows for coarse range determination along a particular probe direction.

According to embodiments of this presentation, each receiver comprises a photonic integrated circuit that collects the light that has been scattered back from a predetermined probing directions and mixes it with the LO signal, for example with an optical coupler receiving the collected light on one input and the LO signal on another input. When such optical coupler is used, the two outputs of the optical coupler can be arranged each to illuminate one of a pair of balanced photodiodes (to eliminate laser noise). The outputs of the photodiodes are an IF signal that can be sent to a signal processing circuit comprising a transimpedance amplifier, band-pass filters, analog to digital converters (ADCs), and integrate-and-store circuits.

Embodiments of this presentation also relate to an algorithm that determines a mean Doppler shifted frequency by measuring the photons at two or more side-bands on each side of the Gaussian PSD mean of the heterodyne formed from the backscattered light in a direction. Embodiments provide for creating a three dimensional wind velocity profile map from a number of wind velocity samples.

Embodiment of this presentation relate to a CW LIDAR Wind Velocity Sensor system that comprises: a first light emitting structure arranged to send a signal light in a first direction in space; a second light emitting structure arranged to produce a local oscillator light having a wavelength different from the wavelength of the signal light by a predetermined wavelength; a receiver arranged to receive light from said first direction in space; and a first optical mixer for mixing the received light with said local oscillator light.

According to an embodiment of this presentation, the source of light comprises a single mode blue laser and said predetermined wavelength corresponds to a predetermined microwave frequency.

According to an embodiment of this presentation, the light emitting structure is arranged to send said signal light in a second direction in space; and the receiver is arranged to receive light from said second direction in space; the system comprising a second optical mixer arranged for mixing the light received from said second direction with said local oscillator light.

According to an embodiment of this presentation, the CW LIDAR Wind Velocity Sensor system comprises a first output pointing at said first direction and a second output pointing at said second direction; a signal optical switch controllably directing said signal light to the first output or to the second output; and a local oscillator optical switch for synchronously directing said local oscillator light to the first optical mixer or to the second optical mixer.

According to an embodiment of this presentation, the CW LIDAR Wind Velocity Sensor system comprises a first high power output optical fiber arranged to output light in said first direction through a transmit lens and a second high power output optical fiber arranged to output light in said second direction through said transmit lens.

According to an embodiment of this presentation, the CW LIDAR Wind Velocity Sensor system comprises a first output mirror arranged for directing the light output by said first high power output optical fiber to the transmit lens; and a second output mirror arranged for directing the light output by said second high power output optical fiber directed to the transmit lens.

According to an embodiment of this presentation, the transmit lens is a Fresnel lens.

According to an embodiment of this presentation, the CW LIDAR Wind Velocity Sensor system comprises an input lens, a first input mirror arranged for directing light hitting the input lens from said first direction to an input of said first optical mixer; and a second input mirror arranged for directing light hitting the input lens from said second direction to an input of said second optical mixer.

According to an embodiment of this presentation, the input lens is a Fresnel lens.

According to an embodiment of this presentation, the input lens and the transmit lens are coplanar and distinct.

According to an embodiment of this presentation, the wavelength of the local oscillator light produced by the second light emitting structure is controlled by a photonic phased locked loop comprising: a loop optical mixer for mixing a portion of said signal light with a portion of said local oscillator light; and a photodiode for measuring the heterodyne of the difference of the wavelengths of the signal light and the local oscillator light.

According to an embodiment of this presentation, the mixer comprises at least first and second collection regions arranged to respectively receive, from the receiver, light backscattered from first and second distances in said first direction in space.

According to an embodiment of this presentation, the receiver comprises: a grating in-coupler arranged to receive said light from said first direction in space and arranged to direct said received light into a first waveguide; the optical mixer comprises a second waveguide coupled to said first waveguide, the second waveguide being arranged to receive said local oscillator light; and first and second grating out-couplers for emitting first and second optical signals output by the first and second waveguides downstream said coupling.

According to an embodiment of this presentation, the first and second waveguides and the gratings are formed in a SiN layer itself formed on a SiO2 layer.

According to an embodiment of this presentation, the CW LIDAR Wind Velocity Sensor system further comprises: first and second balanced photodetectors arranged to receive respectively said first and second optical signals emitted by said first and second grating out-couplers, and an amplifier for subtracting the outputs of the first and second photodetectors.

According to an embodiment of this presentation, the CW LIDAR Wind Velocity Sensor system further comprises first and second bandpass filters arranged to let pass only the signal output by said amplifier in two predetermined bandwidths arranged symmetrically above and below said predetermined microwave frequency.

According to an embodiment of this presentation, the CW LIDAR Wind Velocity Sensor system further comprises: an integrator or integrating over time the signal output by said first and second bandpass filters; and a processor for determining a speed of air in said first direction as a function of a difference between the integrated signals output by said first and second bandpass filters.

An embodiment of this presentation also relates to a LIDAR air velocity mapping device having a plurality of fixed direction LIDARs provided each for: sending a light signal in a predetermined direction; receiving backscattered light from said predetermined direction; and determining a speed of the air in said predetermined direction based on said received backscattered light; wherein each of said fixed direction LIDARs is directed in a different predetermined direction; the LIDAR mapping device being arranged for generating a map of the speed of air in the space around the LIDAR mapping device based on the speed of air determined by each of the fixed direction LIDARs.

According to an embodiment of this presentation, each fixed direction LIDAR is a continuous wave (CW) heterodyne light detection and ranging (LIDAR) system that comprises: a first source of light arranged to send a signal light to at least a first direction in space; a second light emitting structure arranged to produce a local oscillator light having a wavelength different from the wavelength of the signal light by a predetermined wavelength; a receiver arranged to receive light from said first direction in space; and an optical mixer for mixing the received light with said local oscillator light.

An embodiment of this presentation also relates to a method of creating a map of wind velocity; the method comprising: for each of a plurality of predetermined directions, sending a light signal in a predetermined direction from a predetermined location; receiving backscattered light from said predetermined direction; and determining a speed of the air in said predetermined direction based on said received backscattered light; the method further comprising, based on the speed of air determined for each direction, generating a map of the speed of air in the space around said predetermined location.

According to an embodiment of this presentation, said receiving backscattered light from said predetermined direction comprises receiving backscattered light at said predetermined location from a predetermined number of distances from said predetermined direction; the method further comprising using the backscattered light to determine a speed of the air in said predetermined direction at each of said predetermined number of distances.

According to an embodiment of this presentation, said determining a speed of the air in said predetermined direction based on said received backscattered light comprises mixing the received backscattered light with a local oscillator light having a wavelength different from the wavelength of the signal light by a predetermined wavelength.

According to an embodiment of this presentation, said determining a speed of the air in said predetermined direction based on said received backscattered light further comprises: measuring the power of the light mixing along a pair of narrow frequency bands arranged symmetrically around a frequency corresponding to said predetermined wavelength; integrating the power measurements at said pair of frequency bands; and calculating the air speed as a function of the difference between the integrated power measurements at said pair of frequency bands.

These and other features and advantages will become further apparent from the detailed description and accompanying figures that follow. In the figures and description, numerals indicate the various features; like numerals referring to like features throughout both the drawings and the description.

BRIEF DESCRIPTION OF THE DRAWINGS

FIG. 14 is a table comparing features of a LIDAR according to embodiments of this presentation and known LIDARs.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Embodiments of this presentation relate to a LIDAR sensor system that is designed to probe the wind velocity within close proximity to the sensor, up to approximately 5 km away from the sensor. The sensor system is lightweight and is able to operate within a limited power budget, and can be carried by, for example, a balloon or other stratospheric vehicle. Wind velocity sensing in the stratosphere is conducted by measuring the Doppler shift of an optical probe beam when it is backscattered to the sensor. In the stratosphere, the Doppler shift is governed by Rayleigh scattering which varies as $\lambda^{-4}$ where $\lambda$ is the optical beam transmitted wavelength. Thus, smaller wavelength light provides stronger backscatter and embodiments of this presentation preferably use light wavelengths ranging from visible to ultraviolet. Due to the normal thermal velocities of the air molecules, the backscattered light spreads about 5-6 GHz in frequency. However, the PSD of the spread is well known (Gaussian) so that a change in the mean frequency of the PSD is a measure of the wind speed. Coherent heterodyne detection at the sensor receiver allows for wind direction sign ambiguity elimination; and from measurements at multiple points in the volume around the sensor, the wind direction can be determined.

In the troposphere, the scattering is strongest from aerosols (Mie scattering). However, the PSD from Mie scattering has a very narrow linewidth, thus embodiments of this presentation allow avoiding detection of the Mie scattering while still allowing using Rayleigh scattering to measure the Doppler wind velocities profile.

Embodiments of this presentation comprise a CW LIDAR sensor arranged for detecting the wind velocity in a predetermined direction at a predetermined distance from the sensor. Embodiments comprise a mapping device having a plurality of these sensors, arranged for producing a wind velocity profile, local to the sensor, in the stratosphere as well as the troposphere.

Figure 1:
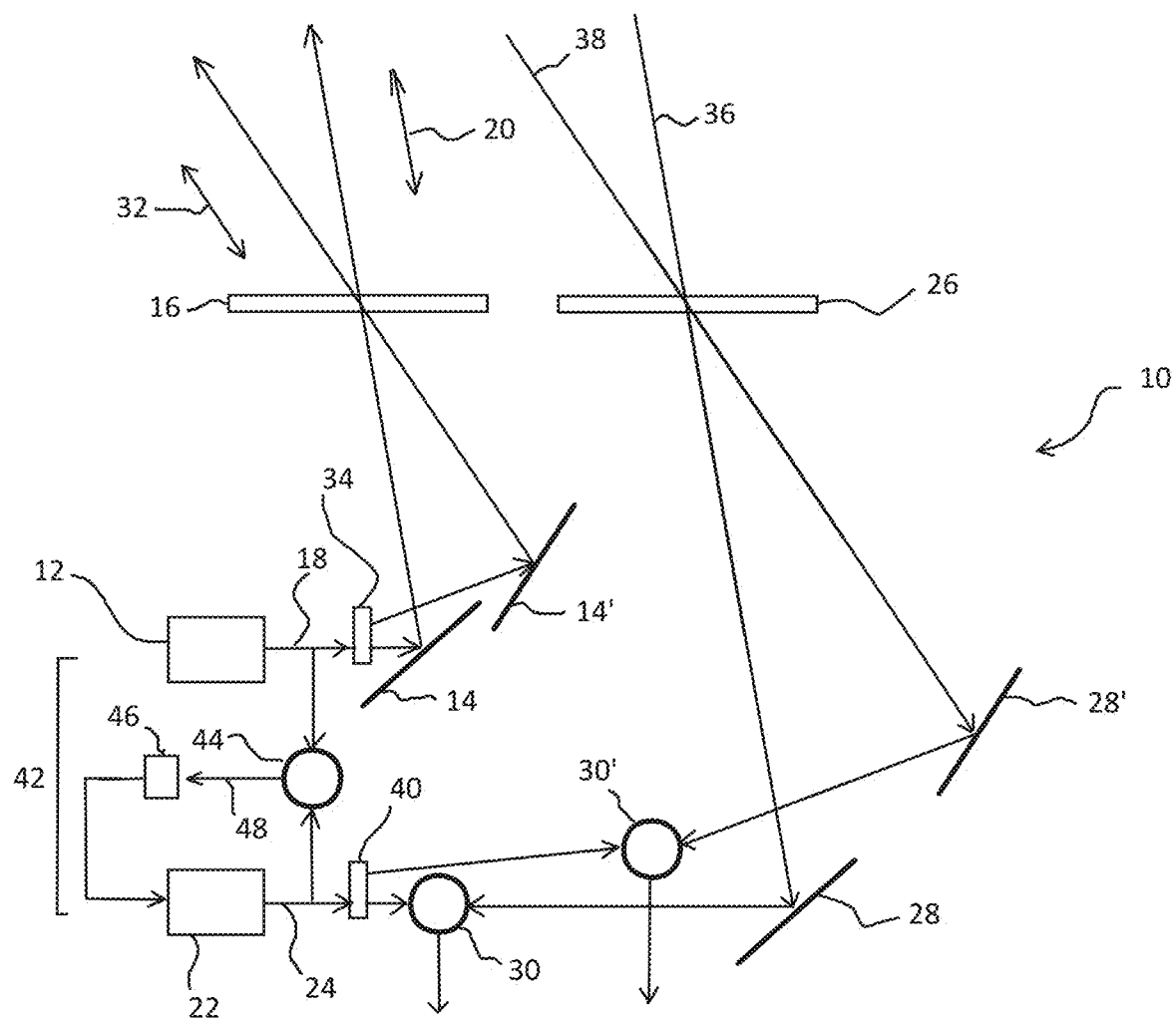
FIG. 1 illustrates schematically a CW heterodyne LIDAR system according to an embodiment of this presentation.

FIG. 1 illustrates schematically a CW heterodyne LIDAR system 10 according to an embodiment of this presentation, comprising: a first light emitting structure (12, 14, 14', 16) arranged to send a signal light 18 to at least a first direction 20 in space; and a second light emitting structure (22) arranged to produce a local oscillator light 24 having a wavelength different from the wavelength of the signal light 18 by a predetermined wavelength. Preferably, the first light emitting structure (12, 14, 14', 16) comprises a single mode blue laser source 12 and the local oscillator light comprises a second single mode blue laser source 22 such that the said predetermined wavelength difference between lasers 12 and 22 corresponds to a predetermined microwave frequency; for example comprised between 3 and 10 GHz. Lidar system 10 further comprises a receiver with a receive path having elements 26, 28, 28' arranged to receive light from said first direction 20 in space; and an optical mixer 30 for mixing the received light with said local oscillator light. The first light emitting structure 12, 14, 14', 16 preferably uses elements physically distinct from those of the receiver 26, 28, 28' to prevent stray transmitted light from being inadvertently detected. The single mode blue laser sources can each have their output connected to a single-mode polarization maintaining optical fiber.

According to an embodiment of this presentation, the first light emitting structure 12, 14, 14', 16 comprises a first output mirror 14 arranged for directing the signal light 18 toward said first direction 20 through a transmit lens 16.

According to an embodiment of this presentation, the first light emitting structure 12, 14, 14', 16 is further arranged to controllably send said signal light 18 to at least a second direction 32 in space; wherein the first light emitting structure comprises a second output mirror 14' arranged for directing the signal light 18 toward said second direction 32 through transmit lens 16. The first mirror 14 and output lens 16 form part of a first output of the LIDAR 10; and the second mirror 14' and output lens 16 form part of a second output of the LIDAR 10. According to an embodiment of this presentation, a signal optical switch 34 is arranged in output of laser source 12 to controllably direct signal light 18 to the first output 14, 16 or to the second output 14', 16.

As detailed hereafter, the first output 14, 16 can comprise a first high power output optical fiber (not shown in FIG. 1) arranged in output of optical switch 34, eventually after a first optical amplifier (not shown in FIG. 1), and the second output 14', 16 can comprise a second high power output optical fiber (not shown in FIG. 1) arranged in output of optical switch 34, eventually after a second optical amplifier. According to an embodiment of this presentation, the mirrors 14, 14' can be omitted and the first and second outputs can comprise only first and second high power output optical fibers arranged to output light in said first 20 and second 32 directions through transmit lens 16.

According to an embodiment of this presentation, the receiver 26, 28, 28' comprises an input lens 26 and a first input mirror 28 arranged for directing light 36 hitting the input lens 26 from said first direction 20 to said optical mixer 30. Input lens 26 and first input mirror 28 form a first input of the receiver. According to an embodiment of this presentation, the receiver 26, 28, 28' is also arranged to receive light 38 hitting the input lens 26 from said second direction 32 in space; wherein it comprises a second input mirror 28' arranged for directing the received light 38 toward a second optical mixer 30' arranged for mixing the light 38 received from said second direction 32 with local oscillator light 24. Input lens 26 and second input mirror 28' form a second input of the receiver 26, 28, 28'. System 10 then comprises a local oscillator optical switch 40 for controllably directing the local oscillator light 24 to the first mixer 30 or to the second mixer 30', synchronously with signal optical switch 34 controllably directing signal light 18 to the first output 14, 16 or to the second output 14', 16.

As detailed hereafter, the first input of the receiver, including first input lens 26 and input mirror 28, can comprise a first grating in-coupler arranged in input of first mixer 30, and the second input of the receiver, including lens 26 and input mirror 28', can comprise a second grating in-coupler arranged in input of second mixer 30'. According to an embodiment of this presentation, the mirrors 28, 28' can be omitted and the first and second inputs can comprise only first and second grating in-couplers arranged to receive respectively lights 36 and 38 through input lens 26. The gratings could then be placed at the focal plane of the lenses. As detailed hereafter, at least one of the transmit lens 16 and the input lens 26 are Fresnel lenses. Preferably, input lens 16 and transmit lens 26 are distinct and are arranged in a coplanar fashion. Fresnel lenses do not need to be used. They are preferred because they are much thinner than a standard lens and thus weigh less.

According to an embodiment of this presentation and with reference to FIG. 1, the wavelength of the local oscillator light 24 produced by the second light emitting structure 22 is a laser source controlled by a photonic phase locked loop 42, said loop 42 comprising: a loop optical mixer 44 arranged for mixing a portion of signal light 18 with a portion of local oscillator light 24; and a photodiode 46 for heterodyne detection of the signal light such that signal 48 is the microwave intermediate frequency corresponding to the difference of the wavelengths of the signal light 18 and the local oscillator light 24.

FIG. 1 illustrates a LIDAR 10 having 2 pairs of outputs/inputs associated with 2 different directions in space, but LIDAR 10 can have any number of pairs of outputs/inputs, each pair corresponding to different directions in space.

As outlined above, all of the optical components illustrated in FIG. 1 can be connected with single mode, polarization preserving fiber. Methods for connecting fibers to optical devices are well known in the art, such as in the reference "Efficient coupling of polarization-maintaining fiber to laser diodes", by H. M. Presby and C. A. Edwards (in IEEE Photonics Technology Letters, vol. 4, no. 8, pp. 897-899, August 1992), hereby incorporated by reference. According to an embodiment of this presentation, laser sources 12 and 22 are blue-light laser sources with a nominal wavelength of 450 nm, but other wavelength lasers could also be used (450-495 nm, or other wavelengths). Also, laser sources 12 and 22 can be semiconductor diode lasers such as described for example in the references "Ultralow-Threshold Laser Realized in Zinc Oxide" by H. Zhu, et. al. (Advanced Material, 2009, 21, 1613-1617), hereby incorporated by reference, and "Tunable high-power narrow-linewidth semiconductor laser based on an external-cavity tapered amplifier" by M. Chi, O. Jensen, J. Holm, C. Pedersen, P. Andersen, G. Erbert, B. Sumpf, and P. Petersen (Opt. Express 13, 10589-10596 (2005)), hereby incorporated by reference, but other laser types (fiber, solid-state) can also be used. The two lasers sources 12 and 22 can be located in close proximity in a central location in LIDAR 10. One laser is the signal seed laser and the other laser is the local oscillator (LO) laser. These lasers must operate with a single optical mode.

Figure 2:
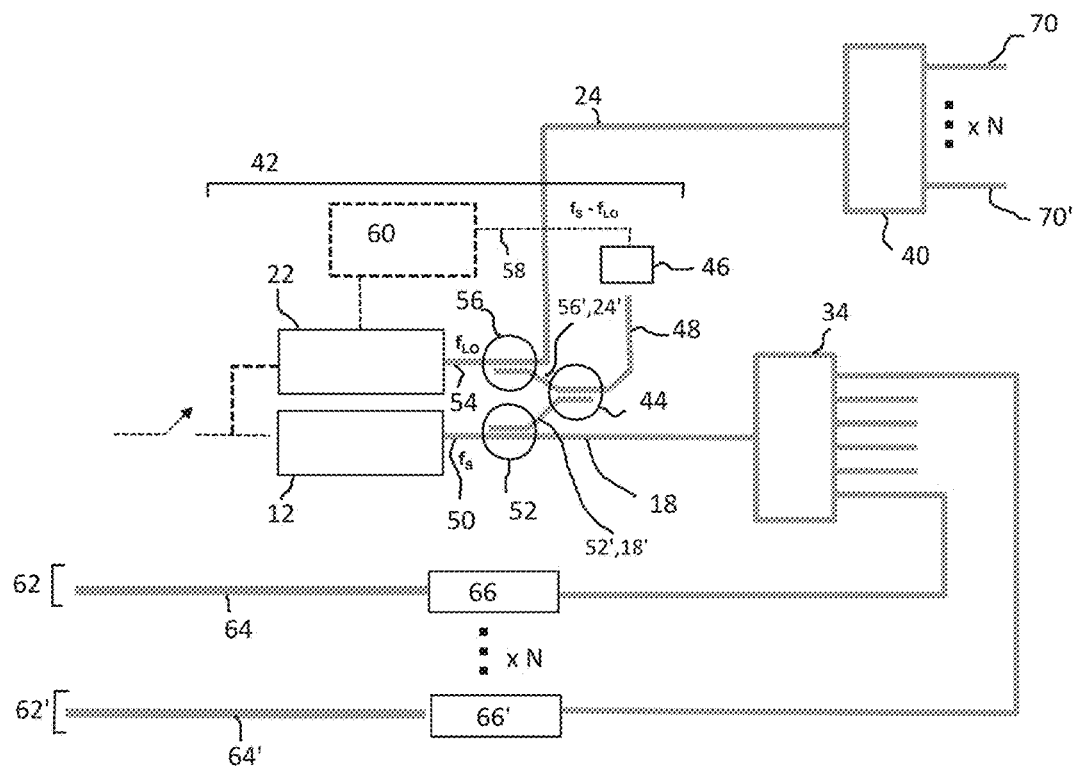
FIG. 2 illustrates schematically an embodiment of the light emitting structure of the LIDAR of FIG. 1.

FIG. 2 illustrates in more detail portions of the LIDAR 10 of FIG. 1, showing in particular laser sources 12 and 22 and phase-locked-loop 42. According to an embodiment of this presentation, laser source 12 can be a semiconductor blue laser coupled in output to a single mode polarization preserving fiber optic 50; an optical coupler 52 such as a fiber optic coupler being arranged to divert a portion 18' of light signal 18 to a fiber optic output 52' of coupler 52. According to an embodiment of this presentation, laser source 22 can be a semiconductor blue laser coupled in output to a single mode polarization preserving fiber optic 54; an optical coupler 56 such as a fiber optic coupler being arranged to divert a portion 24' of light signal 24 to a fiber optic output 56' of coupler 56.

According to an embodiment of this presentation, fiber optic outputs 52', 56' are arranged in input of optical coupler 44, itself arranged to combine signals 24' and 18' and to output a loop optical signal into a single output fiber 48. According to an embodiment of this presentation, photodiode 46 is arranged for, in response to receiving said loop optical signal in fiber 48, outputting an electrical signal 58 that has a frequency that is the difference between the frequencies of optical signals 24' and 18' to a control circuit 60 of said second laser source 22.

According to an embodiment of this presentation, each of laser sources 12 and 22 is a low-power (<100 mW) CW single mode laser of nominally 450 nm wavelength. A frequency difference between the two lasers is maintained at an offset of 5 GHz (±10 kHz) by loop 42, which operates as a frequency-monitoring circuit and active control of the pump current of source 22.

As detailed above, the wavelength of local oscillator light 24 is controlled by a photonic phase-locked loop 42, containing fiber optic couplers 52, 56, 44 to combine part of the signal light 18 with part of the local oscillator light 24, a photodiode 46 where the signal light 18 and local oscillator light 24 are multiplied together to form RF mixing products in the photodetection process. One of those products from the photodiode is the difference frequency between the signal light 18 and the local oscillator light 24: fS-fLO. Other mixing products are filtered out with RF filters. According to an embodiment of this presentation, it is desired to keep this difference frequency constant at a microwave frequency, for example 4 or 5 GHz. The frequency difference should be large enough such that the entire spectral density spread of Doppler frequencies from the Rayleigh scattering is larger than 0 Hz. A photonic phase lock loop is for example described in the reference "Packaged semiconductor laser optical phase-locked loop (OPLL) for photonic generation, processing and transmission of microwave signals", by L. N. Langley et al. (IEEE Transactions on Microwave Theory and Techniques, vol. 47, no. 7, pp. 1257-1264, July 1999), hereby incorporated by reference.

As illustrated in FIG. 2, the light 24 output by source 22 is input to optical switch 40, which is arranged for controllably directing light 24 on N optical fibers (70, 70') toward one of the N optical mixers of LIDAR 10 (N=2 in FIG. 1, where two optical mixers: 30 and 30' are illustrated). Similarly, the light 18 output by source 12 is input to optical switch 34, which is arranged for controllably directing light 18 to one of the N outputs 62, 62' of LIDAR 10. According to an embodiment of this presentation, each output 62, 62' of LIDAR 10 comprises a high power output optical fiber 64, 64' arranged in output of optical switch 34, eventually after a first optical amplifier 66, 66'. Amplifiers 66, 66' can be 2 W semiconductor optical amplifiers. As detailed hereafter, the end of the high power output optical fiber 64, 64' is a transmit point that is a focal point for a transmit telescope in a particular beam direction.

Optical switch 34 (as well as optical switch 40) can be a custom part or can be made from multiple 1×M switches (M a specified number of output ports). Such switches are readily available from commercial sources. Each amplifier (66, 66') can be the same source lasers with anti-reflection coatings instead of high reflectivity coatings. Each high power optical fiber (64, 64') is for example a large mode area photonic crystal fiber. A polished end of each fiber can be in communication with lenses to couple the light from the fiber to free space in a way to interconnect with the mirrors 14, 14' and the lens 16 such that the light is collimated and transmitted in the desired direction to the desired transmission point. The optical switch is operated sequentially such that essentially all of the optical signal is switched to only one transmission point at a time. The period of switching can be determined by the desired number of photons required to be backscattered to the LIDAR 10. Alternatively, it is noted that for example optical fiber signal switch 34 could be replaced with an optical fiber splitter so that all amplifiers are operated at the same time. This would require more power to keep the amplifiers all on at the same time.

According to an embodiment of this presentation, the optical circuit distributing light 24 to the optical mixers (30, 30' in FIG. 1) as well as the optical circuit distributing light 18 to the outputs (62, 62') are both polarization-maintaining circuits. As detailed above, each optical mixer (30, 30') is associated with one of the receiver inputs, which forms a directional pair with one of the outputs of LIDAR 10. Thus, each optical mixer (30, 30') is associated with one of the outputs (62, 62') of LIDAR 10.

According to an embodiment of this presentation, optical switch 34 is operated to activate in turn each of the outputs (62, 62') of the LIDAR 10. In a similar fashion, Polarization Maintaining fiber optic switch 40 is used to distribute the local oscillator light 24 via optical fiber (70, 70') to the associated optical mixer (30, 30') that corresponds to the direction in which the optical signal 18 is transmitted. Alternatively a fiber optic splitter could also be used to provide all receivers with LO power simultaneously, but this would also require a substantially larger LO laser power.

Figure 3:
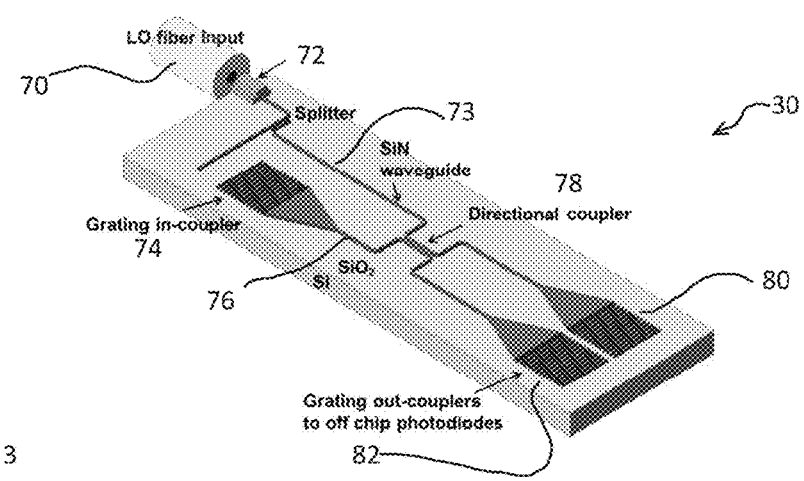
FIG. 3 is an elevation view of an embodiment of an optical mixer of the LIDAR of FIG. 1.

FIG. 3 is a perspective view of an embodiment of parts of an optical mixer 30 of the LIDAR 10 of FIG. 1. Optical mixer 30 receives local oscillator light 24 from an optical fiber 70, for example via an integrated spot-size-converter (SSCs) 72, for example of the type described in the document "Spot-size converter with a SiO2 spacer layer between tapered Si and SiON waveguides for fiber-to-chip coupling" by Y. Maegami, R. Takei, E. Omoda, T. Amano, M. Okano, M. Mori, T. Kamei, and Y. Sakakibara (Opt. Express 23, 21287-21295 (2015), hereby incorporated by reference. Local oscillator light 24 is then sent to a waveguide 73.

Figure 7:
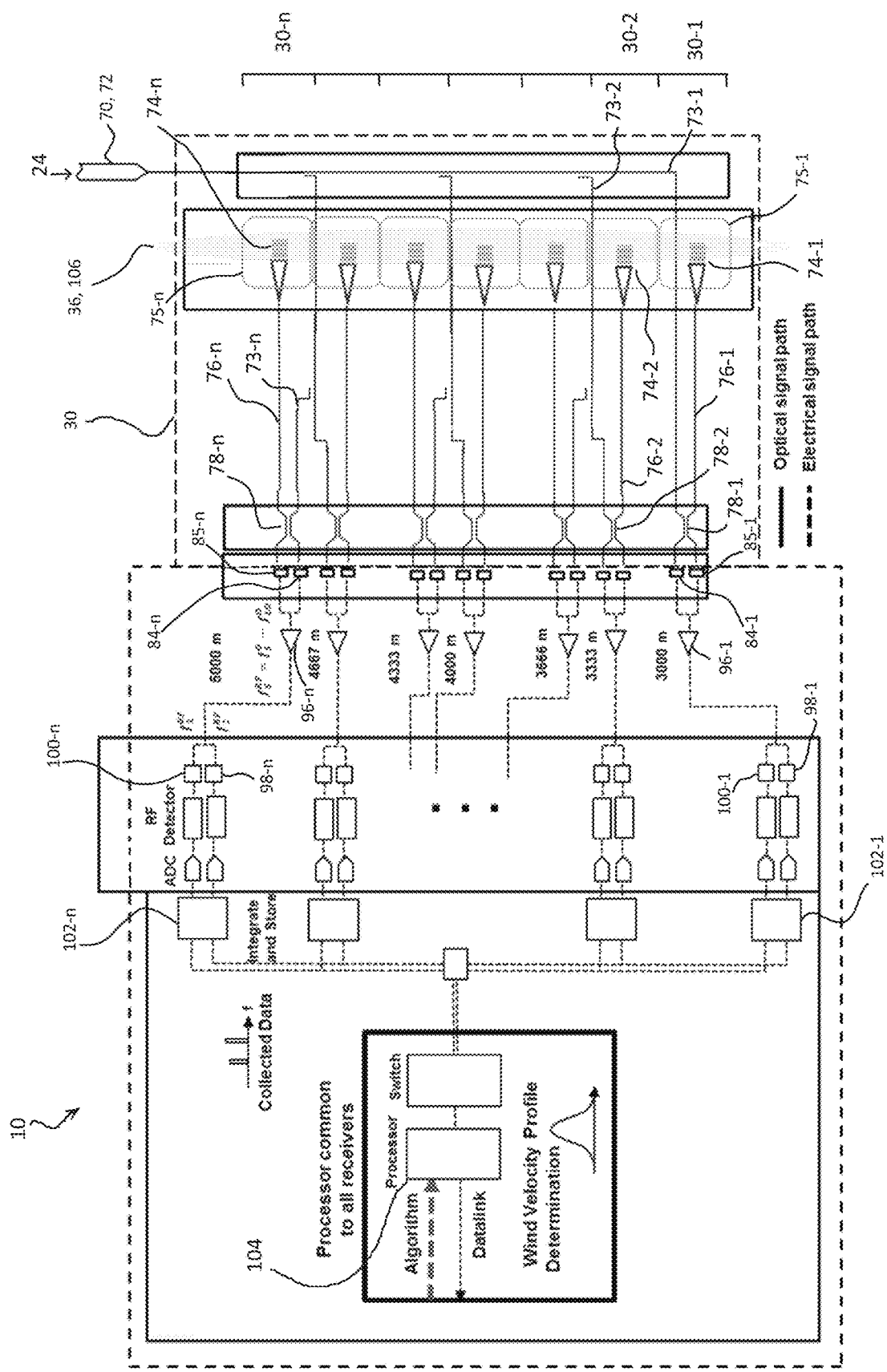
FIG. 7 illustrates schematically a portion of a CW heterodyne LIDAR according to an embodiment of this presentation.

According to an embodiment of this presentation, the light received by LIDAR 10 (for example light 36 received from first direction 20 for optical mixer 30) is collected by an array of grating input couplers (or grating in-coupler) 74. According to an embodiment of this presentation, the light is focused onto the grating coupler 74 using microlenses (75-1 to 75-n as illustrated in FIG. 7), and then sent into a waveguide 76 that is coupled to waveguide 73 at a coupling section 78, such that both waveguides 73 and 76 carry the combined signals downstream of the coupling section 78. Photodiodes (not illustrated) are provided to receive the signals on waveguides 73 and 76 downstream of the coupling section 78, and to effectively mix the lights provided to waveguides 73 and 76. It is noted that the signals in waveguides 73 and 76 have close to identical heterodyne signal power, but are 180 degrees out of phase. This means that by simply subtracting the heterodyne signals output by the photodiodes that receive the light in waveguides 73 and 76, it is possible to reduce the intensity noise due to the local oscillator light 24 with common mode rejection ratios of the order of 30 dB. This is done for example by coupling waveguides 73 and 76 downstream coupling section 78 to grating out-couplers 80, 82 similar to the grating in-coupler 74, which output signals in waveguides 73 and 76 to balanced photodetectors/photodiodes (84, illustrated in FIG. 4) where they are heterodyned. Balanced photodetectors for laser noise reduction are known for example from the reference "High-speed balanced photodetector module with 20 dB broadband common-mode rejection ratio", by A. Beling et al. (OFC 2003 Optical Fiber Communications Conference, 2003, 2003, pp. 339-340 vol. 1), hereby incorporated by reference.

According to an embodiment of this presentation, the gratings, waveguides, and waveguide couplers of optical mixer 30 can be fabricated from a SiN-on-insulator on Si substrate. Such waveguides are known to have very low transmission loss and are suitable for visible light integrated circuits, as outlined for example in the reference "Development of a CMOS Compatible Biophotonics Platform Based on SiN Nanophotonic Waveguides", by Pieter Neutens, et.al., (DOI:10.1364/CLEO_AT.2014.JTh2A.31 Conference: CLEO: Applications and Technology), hereby incorporated by reference.

Also, the grating in/out couplers 74, 80, 82 can be such as described in the reference "Low Loss CMOS-Compatible PECVD Silicon Nitride Waveguides and Grating Couplers for Blue Light Optogenetic Applications", by L. Hoffman et al., in IEEE Photonics Journal, vol. 8, no. 5, pp. 1-11, October 2016, hereby incorporated by reference.

Figure 4:
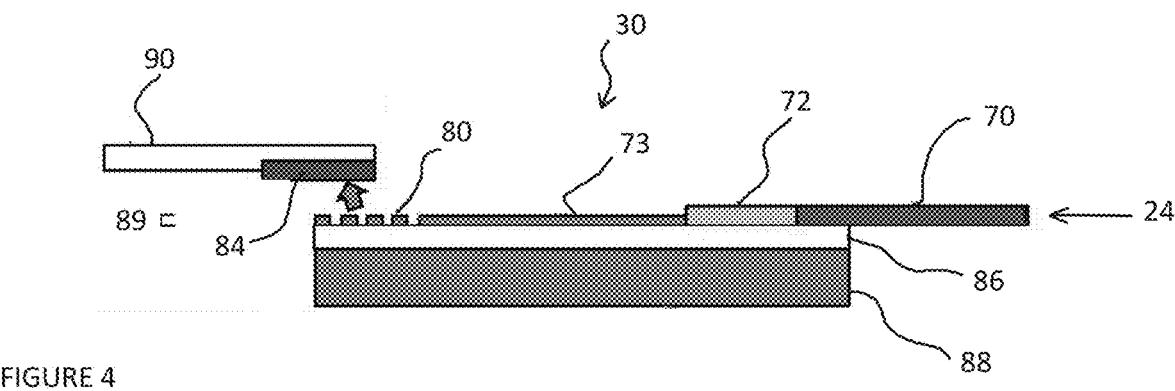
FIG. 4 is a cross section showing the optical mixer of FIG. 3.

FIG. 4 is a cross section showing a portion of the optical mixer 30 of FIG. 3, including optical fiber 70 coupled by spot-size converter 72 to waveguide 73, itself coupled to grating out-coupler 80. Optical mixer 30 is illustrated as formed on an insulator layer 86 of a substrate 88. As illustrated in FIG. 4, a photodiode 84 can be attached to an electronic board 90 distinct from the substrate 88 of optical mixer 30, the board 90 being arranged such that photodiode 84 receives the light to be heterodyned that is output by grating out-coupler 80. According to embodiments of this presentation, the grating out-couplers can be designed with fixed pitch and etch depth for the wavelength of interest. For example, for a 450 nm wavelength light, the grating can have an out-coupled modal structure with its smallest dimension on the order of 4 µm. This corresponds to Rayleigh length of:

$$Z_R = \frac{n\pi\omega_0^2}{\lambda} = 28 \text{ µm}.$$

Assuming Gaussian beam propagation, one can estimate that at 1-mm distance from the chip, the out-coupled mode will diverge to approximately 142 µm that corresponds to a divergence half-angle of 8 degrees and a numerical aperture of 0.14.

According to an embodiment of this presentation, for laser sources emitting a light at 450 nm, Si substrate 88 can have a 200-nm thick SiN layer 89 formed on a SiO2 layer 86, where the passive components (grating and waveguides 80, 73) of mixer 30 can be monolithically fabricated in the 200-nm SiN layer. The SiO2 provides the lower cladding of the SiN waveguides and gratings to prevent leakage to the silicon substrate.

A first fabrication step for mixer 30 is to pattern the passive components in the 200-nm SiN layer. Since the out-coupler grating is shallower than the waveguides, a partial etch of the SiN will be followed by a final waveguide etch while protecting the grating area. After patterning the gratings and waveguides, a thick (~3 micron) SiON film can be deposited. Since the SiON has a higher refractive index than the oxide, it will confine the fiber-coupled light in the spot size convertor waveguide. To maintain selectivity during the relatively deep ridge etch of the Spot Size Converter (SSC), an AlN hard mask can be used. The hard mask is patterned using a stepper and dry etched followed by dry etch of the SiON SCC ridge. A 100-µm trench can then be patterned and etched in the silicon substrate using a Bosch process in a deep reactive ion etcher. A deep trench is required to bring the fiber within microns of the on-chip SSCs for low loss coupling. After the trench etch, the wafer will be sawed, and the receiver die can be assembled with the electronics.

It is noted that mixer 30 can alternatively comprise no grating out couplers, in which case the waveguides 73 and 76, downstream coupling section 78, are arranged to illuminate directly the active area of the photodiodes.

Figure 5:
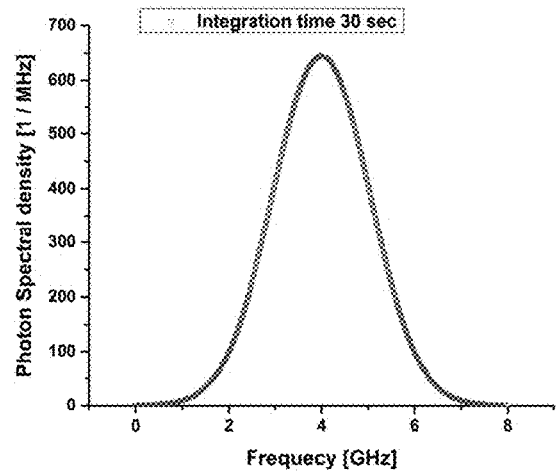
FIG. 5 shows an example of the spectral density from Rayleigh back scattering in the stratosphere.

FIG. 5 illustrates an example of the spectral density from Rayleigh back scattering in the stratosphere. The spectral density is shown in terms of the expected number of received photons at the detector per 1 MHz of bandwidth, at 80,000-ft. altitude, and a 30 second integration time. A transmit optical power of 2 W at 450 nm wavelength was assumed. This photon density is approximately half as large as the one expected at 60000 ft and it is about 20 times larger than at 150000 ft. The temperature, pressure, and range for this calculation are 220 K, 27.6 mbar, and 5 km, respectively.

According to an embodiment of this presentation, the heterodyne signal found from the photodiode 84 has a Power Spectral Density comparable to the spectral density illustrated in FIG. 5; the center of the PSD curve being equal to the difference between the frequency of signal light 18 and local oscillator light 24.

Figure 6:
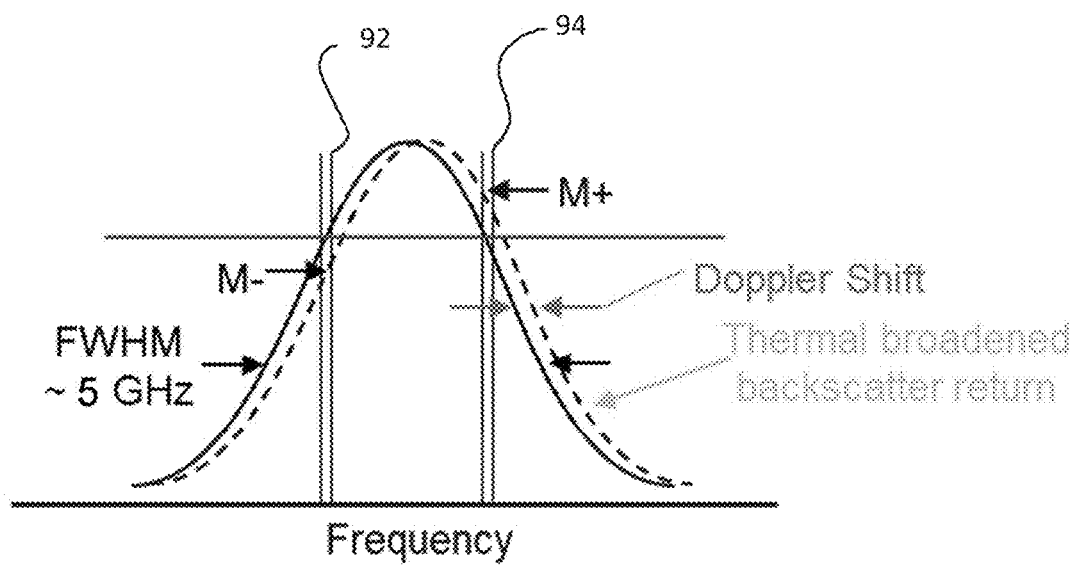
FIG. 6 illustrates the Doppler variations of a scattering spectral density.

FIG. 6 illustrates the Doppler variations of a scattering spectral density such as shown in FIG. 5. In FIG. 6, the solid curve represents a zero-speed distribution of thermally-broadened laser backscatter (similar to FIG. 5 above). The dashed curve represents the same distribution with a systematic Doppler shift due to a wind speed of V.

It isn't necessary to measure the entire back-scattered Doppler spectrum. This is because the thermal motion of molecules at low pressures causes a Gaussian shaped spectral density of the scattered photons (see "Laser Rayleigh scattering" by Richard B Miles, Walter R Lempert, and Joseph N Forkey, [Meas. Sci. Technol. 12 (2001) R33-R51]; hereby incorporated by reference).

Thus, in principle, the Gaussian spectral density of the type shown in FIG. 5 or 6 can be determined with relatively narrowband measurements of the photon power at two frequencies on each side of the peak response. An example of this method is shown in FIG. 6 for the case of a full-width half-maximum (FWHM) spectral spread of 5 GHz, and two 30 MHz filters located preferably at the steepest slopes of the curve on each side of the maximum of the Gaussian. If the wind velocity relative to the sensor were zero, then the measured power (after down-conversion to microwave frequencies) would be equal at each filter. However, if the relative wind velocity of the probed region were non-zero, then the Gaussian maximum would move and the power levels at each filter would be different. This difference could then be readily converted to a shift in the average Doppler frequency which gives the relative wind speed of the probed volume. Of course more measurement points could lead to a better fit of the Doppler spectral density in the presence of noise.

FIG. 6 shows that two band-pass filters 92, 94 (for example 30 MHz band-pass filters) can be arranged symmetrically with respect to the central frequency of the PSD curve (symmetrically to a frequency equal to the difference between the frequency of signal light 18 and local oscillator light 24) to capture the backscatter signal only at the shoulders of the un-shifted curve; whereby in the example illustrated the Doppler-shifted curve yields lower received power (M−) in the lower frequency filter 92 and higher received power (M+) in the higher frequency filter 94.

FIG. 7 illustrates schematically a portion of a CW heterodyne LIDAR 10 according to an embodiment of this presentation, wherein mixer 30 comprises a plurality of collection regions 30-1 to 30-$n$ arranged to respectively receive light 36 backscattered in a same direction 20 from n different distances. According to an embodiment of this presentation, each collection region 30-1 to 30-$n$ comprises a grating in-coupler 74-1 to 74-$n$. According to an embodiment of this presentation, each grating in-coupler 74-1 to 74-$n$ is coupled by a waveguide 76-1 to 76-$n$ to a directional coupler 78-1 to 78-$n$; wherein each coupler 78-1 to 78-$n$ further comprises a waveguide 73-1 to 73-$n$ arranged to receive local oscillator light 24 from optical fiber 70. It is noted that in FIG. 7, all the waveguides 73-1 to 73-$n$ receive local oscillator light 24 from a single optical fiber 70. However, according to an embodiment of this presentation, each of the waveguides 73-1 to 73-$n$ can receive local oscillator light 24 from a different optical fiber 70 in output of local oscillator optical switch 40. According to an embodiment of this presentation, each grating in-coupler 74-1 to 74-$n$ can receive light 36 through a microlens 75-1 to 75-$n$.

According to an embodiment of this presentation each pair of waveguides 73-1, 76-1 to 73-$n$, 76-$n$, downstream the couplers 78-1 to 78-$n$, is coupled to a pair of balanced photodetectors 84-1, 85-1 to 84-$n$, 85-$n$ arranged to receive the optical signals on the waveguides downstream the couplers. According to an embodiment of this presentation, an amplifier 96-1 to 96-$n$ can be arranged in output of each pair of balanced photodetectors 84-1, 85-1 to 84-$n$, 85-$n$ for subtracting the outputs of the photodetectors and generating an analog PSD signal such as illustrated in FIGS. 5 and 6.

According to an embodiment of this presentation a pair of bandpass filters 98-1, 100-1 to 98-$n$, 100-$n$ can be arranged to let pass only the signal output by said amplifier in two predetermined bandwidths arranged symmetrically above and below said predetermined microwave frequency. According to an embodiment of this presentation, each bandpass filter can be followed by a power detector, such as a Root Mean Square power detector, and an Analog to Digital Converter, and provide a signal to an integrator 102-1 to 102-$n$ arranged to integrate over time the signal output by said first and second bandpass filters. According to an embodiment of this presentation, a processor 104 is arranged for determining one speed of air for each pair of bandpass filters 98-1, 100-1 to 98-$n$, 100-$n$, in the direction (20 in FIG. 1) corresponding to mixer 30. The speed of air is associated to each pair of bandpass filters being a function of a difference between the integration of the signals output by each bandpass filters of the pair, and is the speed of air in direction 20 at the distance associated to the collection region 30-1 to 30-$n$ associated to the pair of bandpass filters.

Figure 8:
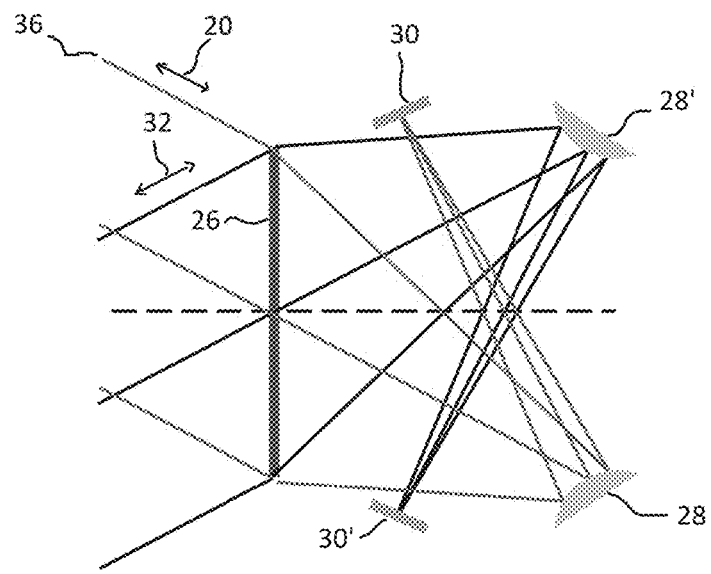
FIG. 8 illustrates schematically a detail of a source of light or receiver of a CW heterodyne LIDAR according to an embodiment of this presentation.

As illustrated in FIG. 8, input lens 26 and input mirror 28 are arranged for directing light 36 emitted at different distances along direction 20 along a focal depth resolved spot collection zone (106 in FIG. 7). According to an embodiment of this presentation, collection regions (30-1 to 30-$n$ in FIG. 7) of mixer 30 are arranged at discrete positions within collection zone (106 in FIG. 7) and are thus each arranged for receiving refracted light emitted along direction 20 at discrete distance ranges corresponding to the position of collection regions 30-1 to 30-$n$ within collection zone 106.

FIG. 8 illustrates schematically that mirrors 28, 28' can be diverging mirrors arranged off-axis with respect to the axis of lens 26; mixers 30, 30' being also arranged off-axis opposite their corresponding mirror. Such an arrangement allows achieving a compact form factor for the input of a LIDAR 10 according to an embodiment of this presentation. It is noted that the outputs 62, 62', mirrors 14, 14' and lens 16, which are for example shown in FIG. 10, can be arranged consistently to the mixers 30, 30', mirrors 28, 28' and lens 26 to form a compact form factor output of LIDAR 10.

Figure 9:
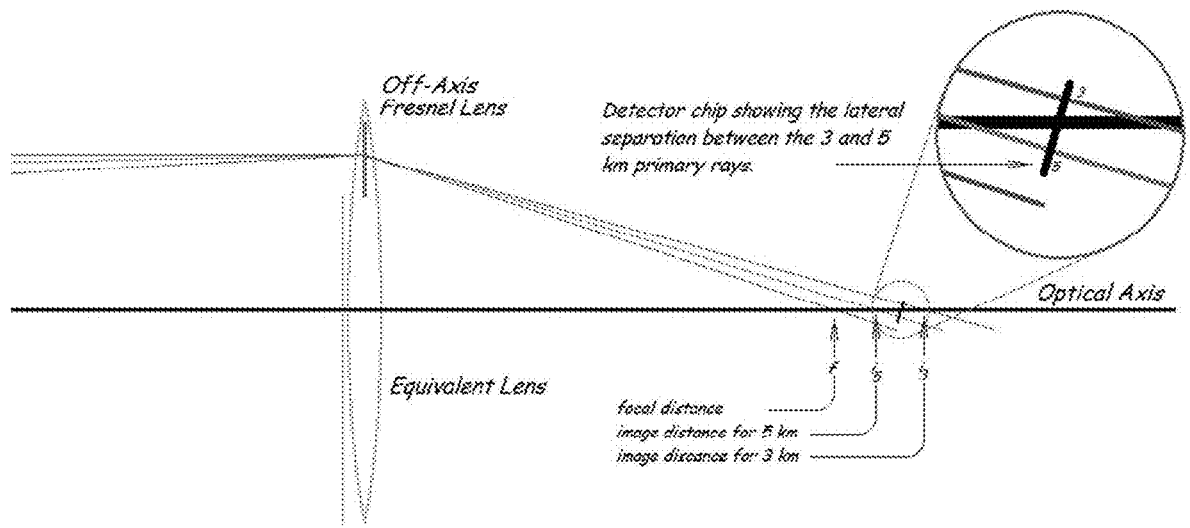
FIG. 9 illustrates schematically a detail of a receiver of a CW heterodyne LIDAR according to an embodiment of this presentation.

FIG. 9 illustrates how spot collection zone 106 is generated according to an embodiment of this presentation. As described before, each receiver mirrors (e.g. mirror 28) can be arranged around the optical axis of the receive lens 26, where the mixer 30 associated to the receiver mirror is at a nominal focal point of the lens 26 for the corresponding direction. According to an embodiment of this presentation, range resolution can be achieved by exploiting the small size of the grating in-couplers 30-1 to 30-$n$ on the mixer 30 chip and by using depth of focus to resolve a few large range bins along the focal axis. It is noted that the off-axis optics helps to avoid a shadowing effect of the several focal depths to which symmetric optics would otherwise be subject.

Differentiating the lens makers equation (see Robert D. Gunther, Modern Optics, John Wiley and Sons, New York, 1990m pg. 183, hereby incorporated by reference) allows us to relate changes to the object distance and image distance, o and I respectively, to the object distance and focal length, with the result $\Delta i/\Delta o = (f/o)^2$. For example, for an object distance of o=5 km, and a $\Delta o$=0.333 km range resolution, effective focal lengths of 2 to 5 meters result in a $\Delta i$ of 50 to 500 microns. The size of the beam waist in the image plane indicates the closest useful lateral spacing for the various focal depths. The beam waist depends on the focal number f # of the optical system and is given by: Wo=2λf #/π. Then, for a 20 cm diameter lens and a focal length in the 2 to 5 meter range, the beam waist is 3 μm<Wo<8 μm. Continuing with the example, a spread in the focal depth such that for example 7 range measurements exist side-by-side at the focal region, the shallow angular intersection between the off axis focus and the optical axis (tan θ~0.1, exaggerated in the figure), would require and optical layout of the image resolutions of 210 μm<Δi<560 m.

FIG. 7 illustrates a mixer chip 30 according to an embodiment of this presentation, having seven collection regions 30-1 to 30-n within collection zone 106. The seven collection regions correspond each to one of seven measurement ranges, distant from each other by 333 meter, between 3000 and 5000 meter.

Figure 10:
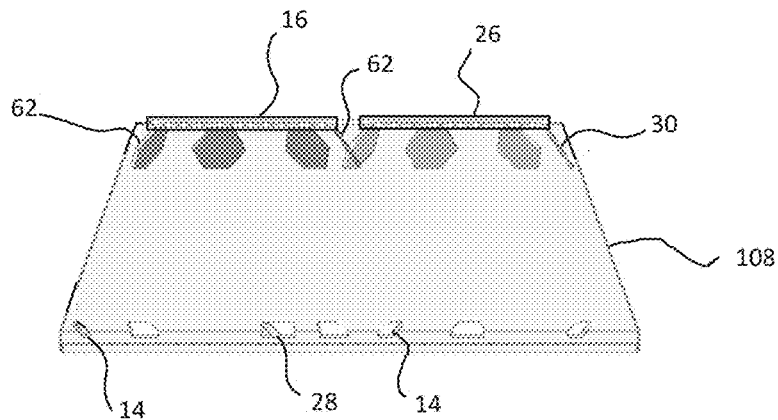
FIG. 10 is a cross-section of a portion of a CW heterodyne LIDAR according to an embodiment of this presentation.

FIG. 10 is a perspective view of a portion of a CW heterodyne LIDAR mapping device using a LIDAR 10 according to an embodiment of this presentation, wherein output lens 16 and input lens 26 are mounted coplanar on top of a same housing 108. According to an embodiment of this presentation, housing 108 can be in the general shape of a trunk of a laterally elongated cone and can be made out of carbon fiber (carbon fiber reinforced polymer (CFRP)) so as to be strong and lightweight. The lenses 16, 26 are arranged along a plane at the top of the trunk of a cone. Mixer 30 and mirror 28 are arranged with respect to lens 26 as illustrated in FIG. 8. It is noted that the chip on which mixer 30 is formed can be attached to the electronic chip on which at least photodiodes or photodetectors 84, 85 are formed, thus forming a single hybrid chip that can be arranged in housing 108 at the location indicated for mixer 30 in FIG. 10.

Similarly, output 62 and mirror 14 are arranged with respect to lens 16 as illustrated in FIG. 8 regarding mixer 30 and mirror 28. As illustrated in FIG. 10, such arrangement allows having a plurality of pairs of exit 62, mirror 14 and corresponding pairs of mixer 30 and mirror 28 for only one pair of lenses 16, 26; wherein each pair of exit 62, mirror 14 and corresponding pair of mixer 30 and mirror 28 is arranged to conduct air speed measurement in a different direction (in as many measurement distances as provided by mixer 30). According to an embodiment of this presentation, each lens 16, 26 can have a diameter of 20 centimeter. Fresnel lenses can be used to save on weight. The fiber optic networks are not shown in this figure for clarity. It is noted that in FIG. 10, exit 62 is illustrated as comprising a hexagonal board similar to the receiver board of mixer 30. However, output 62 is more generally where the fiber optic 64 ends, which would also be a point at a focal length from the lens 16. For example, exit 62 can comprise a support or clamp arranged to hold the end of the high power fiber 64.

According to embodiments of this presentations, a LIDAR 10 such as illustrated in FIG. 10 can be made from an assembly of three CFRP components: a base plate for mounting the diffractive mirrors and attaching to the truss/trunk of cone structure, the truss/trunk of cone structure, on which will be mounted the transmitter and receiver boards, and a lid that will mount the pair of Fresnel lenses. This three-part design simplifies the manufacturing, assembly and optical-alignment processes; additionally, this "closed can" design protects the components from the environment.

Carbon fiber reinforced polymer (CFRP) is a preferred material, based on its high stiffness-to-weight ratio, low thermal expansion and mature manufacturing processes. Pultruded tubes and rods are widely available and easily sourced and/or customized if specialized resins or fibers are required.

Figure 11:
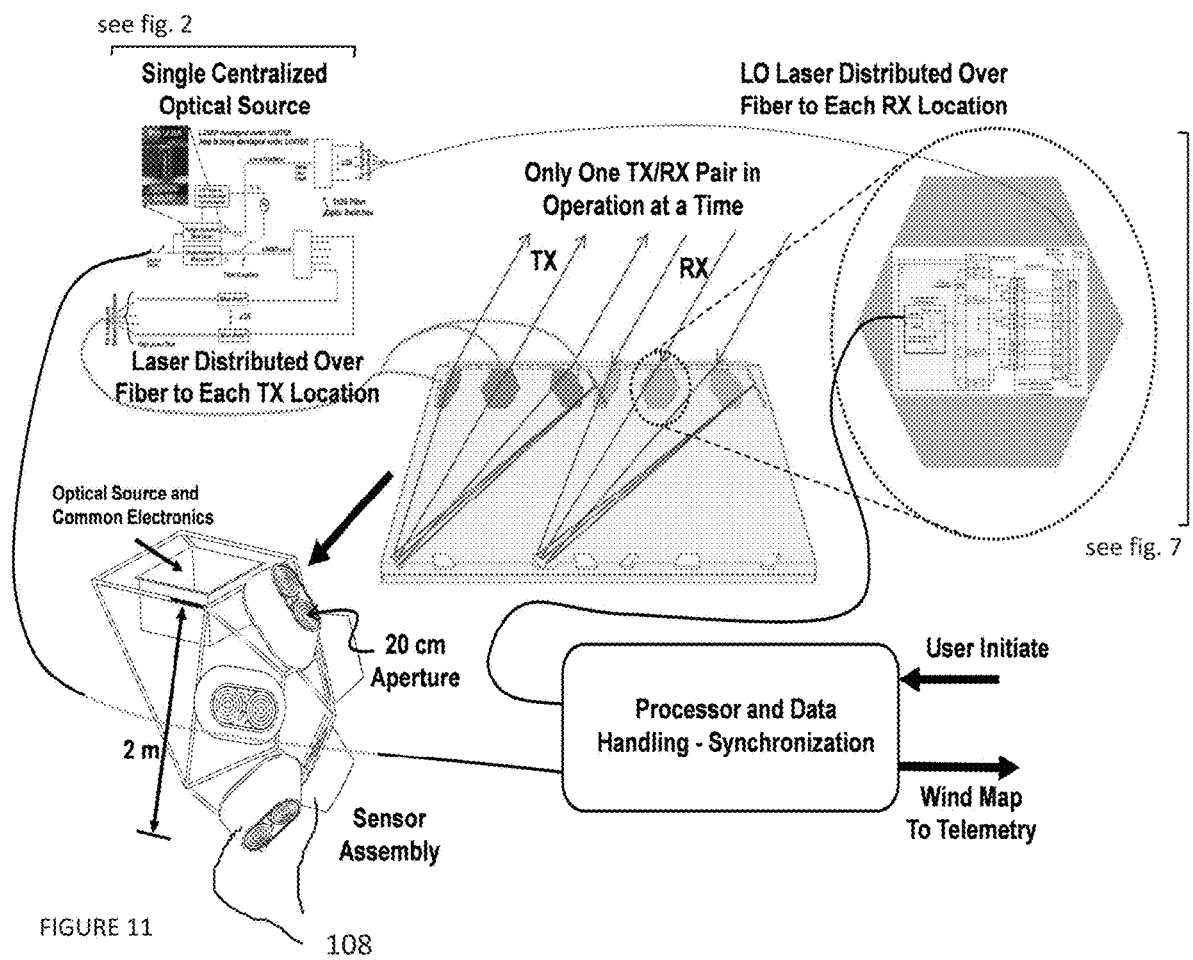
FIG. 11 shows a LIDAR mapping device according to embodiments of this presentation.

FIG. 11 shows a LIDAR mapping device according to embodiments of this presentation, comprising 5 pairs of transmit and receive (TX/RX) telescopes. Each TX/RX pair of telescopes, contained in a carbon fiber support unit, has seven transmitters and seven receivers so that five pairs of telescopes covers the forward-looking volumes, with an azimuthal pitch of π/6 radians and an elevation pitch of a bit less than π/4 radians (to avoid shadowing above by the balloon). In all with this system embodiment, 35 beam-pointing directions will cover this volume. Although this embodiment is described in this section, one skilled in the art would readily know how to apply this invention to cover other volumes in space and TX/RX arrangements to provide other pitch angles. The sensor system shown in FIG. 11 uses COTS fiber-optic components to distribute the high-power optical signal from a centralized location to the five transmitters (each transmitter is paired with a receiver to form a single TX/RX unit). An individual fiber can carry a transmit signal of 2 W (or more) to each transmitter in each TX/RX pair structure around the sensor ring. Each fiber termination is an optical source point that is then collimated by the transmitter optics before launching into the stratosphere. As outlined above, the illustrated LIDAR mapping device comprises a plurality of housings 108 as illustrated in FIG. 10, arranged on the sides of a multi-faceted pyramidal frame. According to an embodiment of this presentation, the common laser sources and electronics for all LIDARs 10 can be arranged inside the pyramidal frame.

According to an embodiment of this presentation, each LIDAR in each of the housings 108 is provided for: sending a light signal in a different predetermined direction; receiving backscattered light from said predetermined direction; and determining a speed of the air in said predetermined direction based on said received backscattered light. According to an embodiment of this presentation the LIDAR mapping device is arranged for generating a map of the speed of air in the space around the LIDAR mapping device based on the speed of air determined by each of the fixed direction LIDARs.

As outlined above, each fixed direction LIDAR of housing 108 can be a continuous wave (CW) heterodyne light detection and ranging (LIDAR) system that comprises: a first light emitting structure arranged to controllably send a signal light to at least a first direction in space; a second light emitting structure arranged to produce a local oscillator light having a wavelength different from the wavelength of the signal light by a predetermined wavelength; a receiver arranged to receive light from said first direction in space; an optical mixer for controllably mixing the light received from the direction in space the light was sent to with said local oscillator light.

Figure 12:
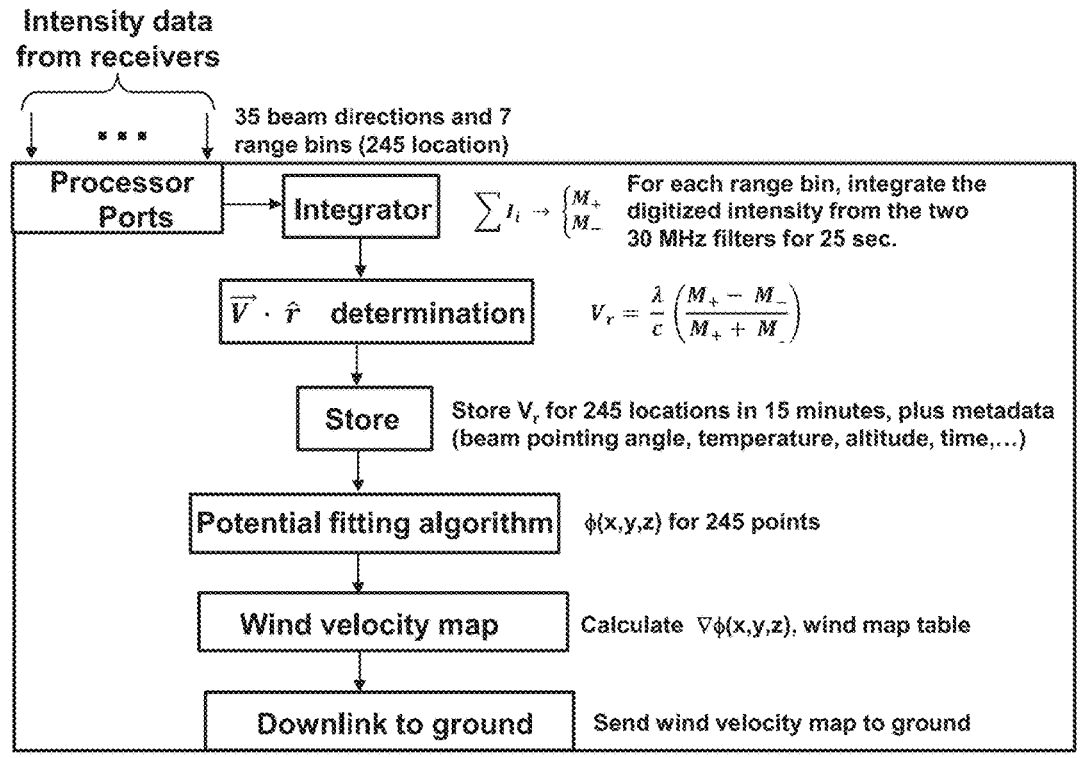
FIG. 12 illustrates a method of calculating a wind map table according to an embodiment of this presentation.

FIG. 12 illustrates a method of calculating a wind map table according to an embodiment of this presentation; the method comprising:

in response to sending (not shown in FIG. 12) a light signal in a predetermined direction from a predetermined location, receiving backscattered light from said predetermined direction; and determining a speed of the air in said predetermined direction based on said received backscattered light, as illustrated in FIG. 12;

repeating the above steps until air speed is detected in a plurality of directions around said predetermined location (in 35 beam directions for 7 range bins in FIG. 12); and generating a map of the speed of air in the space around said predetermined location.

According to an embodiment of this presentation, the step of receiving backscattered light from said predetermined direction comprises receiving backscattered light at said predetermined location from a predetermined number of distances from said predetermined direction; the method further comprising using the backscattered light to determine a speed of the air in said predetermined direction at each of said predetermined number of distances.

According to an embodiment of this presentation, the signal that reaches the input of FIG. 12 is already digitized and comes sequentially from each range bin 102-$n$ and each mixer 30 to a central processing station located on the stratospheric LIDAR system. According to an embodiment of this presentation, the onboard computer can calculate the wind velocity map and then send that map to ground via a data link. In this way the data link to ground need only operate when the map is ready and thus need not be on all of the time.

According to an embodiment of this presentation, the step of determining a speed of the air in said predetermined direction based on said received backscattered light comprises mixing the received backscattered light with a local oscillator light having a wavelength different from the wavelength of the signal light by a predetermined wavelength. According to an embodiment of this presentation, the step of determining a speed of the air in said predetermined direction based on said received backscattered light further comprises measuring the power of the light mixing along a pair of narrow frequency bands arranged symmetrically around a frequency corresponding to said predetermined wavelength; integrating the power measurements (M+, M−) at said pair of frequency bands; and calculating the air speed as a function of the difference between the integrated power measurements $$\left(Vr = \frac{\lambda}{c}\left(\frac{M+ - M-}{M++M-}\right)\right)$$

at said pair of frequency bands. According to an embodiment of this presentation, each calculated speed is used in a fitting algorithm to calculate a wind-velocity map around said predetermined location.

Such processing of the intensity data from the receivers occurs for example in the processor illustrated to the left of FIG. 7, where the algorithm that determines the mean Doppler shifted frequency from the two or more sampled photon returns is implanted. It is a good approximation that the stratospheric winds are curl-free (low Mach number, low viscosity, low Reynolds number) and divergence-free (incompressible, no sources or sinks). The curl-free assumption means the velocity field is the gradient of a scalar potential $\psi$. The zero divergence then means the scalar potential satisfies Laplace's equation, $\Delta\psi=0$, in the region of interest.

A multipole expansion can be performed that contains a radial component along with spherical harmonics to express $\psi$ as a series, $$\psi(r, \theta, \phi) = \sum_{l=0}^{\infty} \sum_{m=-l}^{l} f_l^m r^l Y_l^m(\theta, \phi),$$

where $Y_l^m$ are the spherical harmonics and $f_l^m$ are coefficients. The coefficients are found by fitting the series form for $\psi$ to our measurements. Lidar Doppler measurements of the velocity field V are line integrals $$s_i = \frac{1}{L}\int_{L_i} V \cdot dl =$$
$$\frac{1}{L}[\psi(b_i, \theta_i, \phi_i) - \psi(a_i, \theta_i, \phi_i)] = \frac{1}{L}\sum_{l=0}^{\infty}\sum_{m=-l}^{l} f_l^m(b_i^l - a_i^l)Y_l^m(\theta_i, \phi_i)$$

where $L_i$ is the line of length L along the radial direction between radii $a_i$ and $b_i$, with elevation and azimuthal angles $\theta_i$ and $\phi_i$, respectively. With a sufficient number of measurements along multiple radial directions and spherical angles, numerical curve-fitting methods, such as least means square, determine the coefficients $f_l^m$ in the series expansion. The series is terminated when the last coefficient is at least an order of magnitude smaller than the largest coefficient. As the form of the multipole expansion is derived from physical principles, the divergence-free and curl-free conditions, the fitted solution is a physically realistic scalar potential that satisfies Laplace's equation at every point. Taking the gradient of the scalar potential returns the wind flow field $V=\nabla\psi$.

The sensor motion would be used truth data to validate the calculated wind flow field. Since the potential is proportional to atmospheric pressure, the pressure difference between both sides of the vehicle also provides another point to validate the scalar potential estimate. As the platform drifts with the wind, the observed hemispheres overlap, allowing for the reuse of samples in the overlap region from a previous set of measurements in calculating current estimates of the scalar potential, thereby improving on the accuracy of the current estimate through an increased number of available samples.

An advantage of the approach outlined above is to transform a vector field tomography problem into a scalar tomography problem via the scalar potential reducing the dimensionality from 3 to 1. Requiring potentials to satisfy Laplace's equation adds physically realistic constraints that minimize the search space for the fitted wind flow field. Spherical harmonics put the solutions into a form that matches the measurements, which are taken in radial directions.

Figure 13:
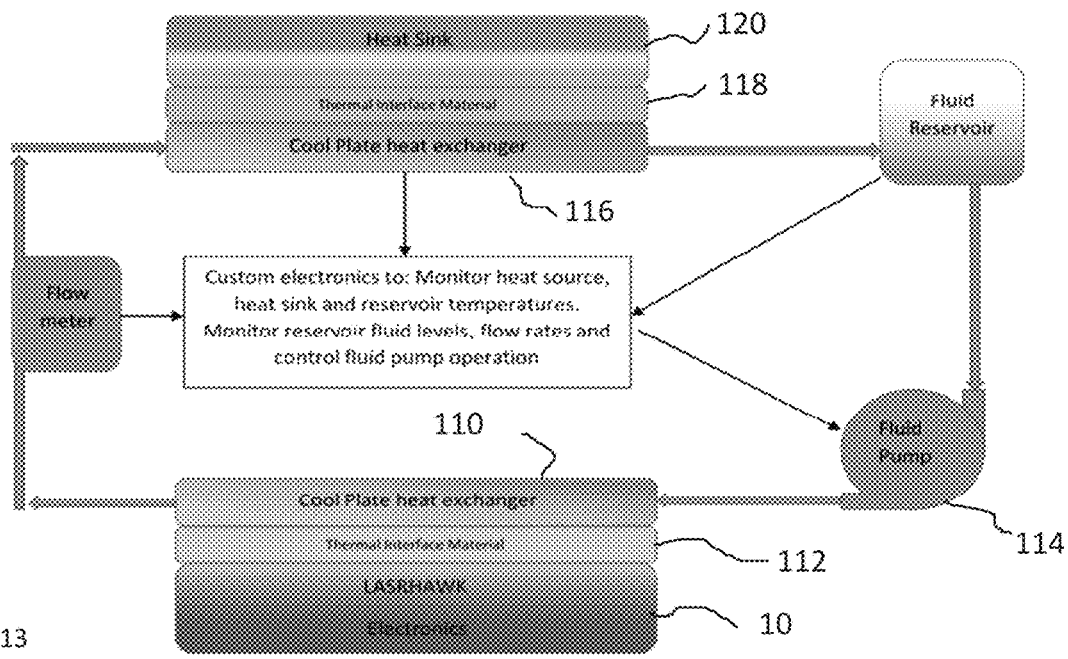
FIG. 13 illustrates schematically the heat regulation of a LIDAR according to embodiments of this presentation.

FIG. 13 illustrates schematically the heat regulation of a LIDAR according to embodiments of this presentation, wherein a first cold plate heat exchanger 110 is thermally coupled 112 to LIDAR 10 (in particular its laser sources). A fluid pump 114 exchanges a heat transfer liquid with a second cold plate heat exchanger 116, itself coupled 118 to a heat sing 120. A flow meter 122, arranged for example between the first 110 and second 116 cold plate heat exchangers allows, together with an electronic circuit also connected to the fluid pump (and optionally to a fluid reservoir) to maintain the temperature of operation of the laser sources to a desired level.

Options for heat management are limited due to the rarefied air at the highest expected service altitudes. Assuming the payload module has an on-board heat sink where one can shed the thermal energy generated from the lasers and other electronics, a preferred transport method is by conduction and conduction/convection. Accordingly, an embodiment of this presentation provides for using a conduction/convection heat exchanger design and leveraging a readily available computer liquid cooling systems. As an example, a typical low-power computer can dissipate about 25 W, and more powerful computer CPUs dissipate upwards of 100 W. Liquid cooling heat exchangers are used in computer heat management when the thermal design power (TDP) is high. Such an off-the-shelf solution can be leveraged in this presentation with modifications to the heat rejection components. For example, the heat fins used to exchange the heat removed from the electronics package in a COTS solution can be replaced with a cool plate that connects to a heat sink on the craft.

FIG. 14 is a table comparing features of a LIDAR according to embodiments of this presentation (CW Doppler LIDAR) and known LIDARs (pulsed, coherent LIDAR and pulsed, non-coherent LIDAR).

An example of the optical power budget of the LIDAR sensor can be seen in table 2 hereafter for the case of backscattered light spectral density illustrated in FIG. 5. The average heterodyned optical power is ~220 pW. The noise equivalent power (NEP) for a typical Si avalanche photodiode (APD), such as the Excelitas C30902EH, is $$\sim 3 \frac{fW}{\sqrt{Hz}}$$

[Excelitas, C30902ED data sheet may be found at: www.excelitas.com/Downloads/Silicon_InGaAs_APDs.pdf, hereby incorporated by reference]. This detector has an active area of 500 μm and responsivity of 10 A/W and 30 A/W at 450 nm and 490 nm, respectively. The detector bandwidth is about 700 MHz. With an RF filter of 28 MHz at the output of the photodetector, the resulting minimum detectable power will be $P_{nep}=NEP\sqrt{BW} \approx 16$ pW.

Similar NEPs are possible for larger photodetector bandwidths (~8 GHz) [Alphalas UPD-40-UVIR-P data sheet can be found at www.alphalas.com/images/stories/products/laser_diagnostic_tools/Ultrafast_Photodetectors_UPD_AL-PHALAS.pdf, hereby incorporated by reference]. With a dark equivalent noise power of 16 pW, the average signal-to-dark noise ratio is about 14 (11.5 dB), resulting in high probability of detection of the low number of backscattered photons.

TABLE 2

An eample of an estimated optical power budget for the LIDAR receiver based upon the backscattered spectral density shown in FIG. 2.

| Receiver Section | Corresponding Loss [dB] | Average Incoming Signal Power [fW] | Average LO Power [mW] | Heterodyne Power [pW] |
|---|---|---|---|---|
| Input | 0 | 0.15 | 2 | — |
| Grating Incoupler | 1.5 | 0.106 | — | — |
| SSC | 1 | — | 1.6 | — |
| Waveguide | | 0.085 | 1.28 | — |
| Directional Coupler | 0.2 | 0.081 | 1.21 | — |
| Grating Outcoupler | .5 | 0.057 | 0.86 | — |
| After Balanced Photodetector | — | — | — | 221 |

The rest of the electronics (such as including elements 98 and 100 shown in FIG. 7) contains all of the electronics needed to amplify, filter and sample the photocurrent produced by the balanced photodiodes. In the embodiment of FIG. 7, two samples of the backscattered power spectrum are taken as described in FIG. 6, although by adding additional channels more samples could be taken. A wideband (8 GHz) transimpedance amplifier (TIA) can convert the photocurrent to a voltage. Two bandpass filters with a bandwidth equal to 30 MHz can capture received power on either side of the peak. The total power can be measured by a RMS power detector at the output of each filter, and then quantized with a low speed ADC such as Analog Devices 7173-8, a 24-bit, 31.25 kSps sigma-delta converter [Analog Devices 7173-8 ADC data sheet can be found at: http://www.analog.com/en/products/analog-to-digital-converters/ad-converters/ad7173-8.html In the embodiment illustrated there are seven range bins, each with 2 ADCs. Thus, in 25 seconds, one obtains 262.5 Mbit of data. Only one receiver at a time is used, and because of the relatively short distance to the on-board computer, a common serial peripheral interface can be used for data transfer to the data storage and processor.

The electronic amplifiers of the next-in-line receiver of the direction scanning sequence can advantageously be turned on seconds ahead of the laser in order to warm-up. Then, just before the laser is turned on, a measurement could be taken of the background photonic and electronic noise, which could be used as a calibration to be subtracted out of the measured PSD of the backscattered photons. This would work in the stratosphere where the changes in the rate of scattered photons from a given direction, but outside the volume of interest, is relatively constant. In the troposphere, where there can be severe turbulence, this calibration step should be done periodically throughout the measurement period. This is easily accomplished by switching the lasers and/or optical amplifiers on and off with a low duty cycle.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A CW LIDAR Wind Velocity Sensor system that comprises:
   a first light emitting structure arranged to send a signal light in a first direction in space;
   a second light emitting structure arranged to produce a local oscillator light having a wavelength different from the wavelength of the signal light by a predetermined wavelength;
   a receiver arranged to receive light from said first direction in space;
   a first optical mixer for mixing the received light with said local oscillator light; wherein the light emitting structure is arranged to send said signal light in a second direction in space; and wherein the receiver is arranged to receive light from said second direction in space; the system comprising a second optical mixer arranged for mixing the light received from said second direction with said local oscillator light.

2. A CW LIDAR Wind Velocity Sensor system that comprises:
   a first light emitting structure arranged to send a signal light in a first direction in space;
   a second light emitting structure arranged to produce a local oscillator light having a wavelength different from the wavelength of the signal light by a predetermined wavelength;
   a receiver arranged to receive light from said first direction in space;
   a first optical mixer for mixing the received light with said local oscillator light; wherein the source of light comprises a single mode blue laser and wherein said predetermined wavelength corresponds to a predetermined microwave frequency.

3. The CW LIDAR Wind Velocity Sensor system of claim 1, comprising a first output pointing at said first direction and a second output pointing at said second direction; a signal optical switch controllably directing said signal light to the first output or to the second output; and a local oscillator optical switch for synchronously directing said local oscillator light to the first optical mixer or to the second optical mixer.

4. The CW LIDAR Wind Velocity Sensor system of claim 1, comprising a first high power output optical fiber arranged to output light in said first direction through a transmit lens and a second high power output optical fiber arranged to output light in said second direction through said transmit lens.

5. The CW LIDAR Wind Velocity Sensor system of claim 4, comprising: a first output mirror arranged for directing the light output by said first high power output optical fiber to the transmit lens; and a second output mirror arranged for directing the light output by said second high power output optical fiber directed to the transmit lens.

6. The CW LIDAR Wind Velocity Sensor system of claim 4, wherein said transmit lens is a Fresnel lens.

7. The CW LIDAR Wind Velocity Sensor system of claim 5, comprising an input lens, a first input mirror arranged for directing light hitting the input lens from said first direction to an input of said first optical mixer; and a second input mirror arranged for directing light hitting the input lens from said second direction to an input of said second optical mixer.

8. The CW LIDAR Wind Velocity Sensor system of claim 7, wherein said input lens is a Fresnel lens.

9. The CW LIDAR Wind Velocity Sensor system of claim 4, wherein said input lens and said transmit lens are coplanar and distinct.

10. A CW LIDAR Wind Velocity Sensor system that comprises:
    a first light emitting structure arranged to send a signal light in a first direction in space;
    a second light emitting structure arranged to produce a local oscillator light having a wavelength different from the wavelength of the signal light by a predetermined wavelength;
    a receiver arranged to receive light from said first direction in space;
    a first optical mixer for mixing the received light with said local oscillator light; wherein the wavelength of the local oscillator light produced by the second light emitting structure is controlled by a photonic phased locked loop comprising a loop optical mixer for mixing a portion of said signal light with a portion of said local oscillator light, and a photodiode for measuring the heterodyne of the difference of the wavelengths of the signal light and the local oscillator light.

11. The CW LIDAR Wind Velocity Sensor system of claim 1, wherein the mixer comprises at least first and second collection regions arranged to respectively receive from the receiver light backscattered from first and second distances in said first direction in space.

12. A CW LIDAR Wind Velocity Sensor system that comprises:
    a first light emitting structure arranged to send a signal light in a first direction in space;
    a second light emitting structure arranged to produce a local oscillator light having a wavelength different from the wavelength of the signal light by a predetermined wavelength;
    a receiver arranged to receive light from said first direction in space;
    a first optical mixer for mixing the received light with said local oscillator light; wherein
    said receiver comprises a grating in-coupler arranged to receive said light from said first direction in space and arranged to direct said received light into a first waveguide;
    said optical mixer comprises a second waveguide coupled to said first waveguide, the second waveguide being arranged to receive said local oscillator light; and first and second grating out-couplers for emitting first and second optical signals output by the first and second waveguides downstream said coupling.

13. The CW LIDAR Wind Velocity Sensor system of claim 12, wherein said first and second waveguides and said gratings are formed in a SiN layer itself formed on a SiO2 layer.

14. The CW LIDAR Wind Velocity Sensor system of claim 12, further comprising first and second balanced photodetectors arranged to receive respectively said first and second optical signals emitted by said first and second grating out-couplers, and an amplifier for subtracting the outputs of the first and second photodetectors.

15. The CW LIDAR Wind Velocity Sensor system of claim 14, further comprising first and second bandpass filters arranged to let pass only the signal output by said amplifier in two predetermined bandwidths arranged symmetrically above and below said predetermined microwave frequency.

16. The CW LIDAR Wind Velocity Sensor system of claim 15, further comprising an integrator or integrating over time the signal output by said first and second bandpass filters; and a processor for determining a speed of air in said first direction as a function of a difference between the integrated signals output by said first and second bandpass filters.

* * * * *